Patented Dec. 21, 1937

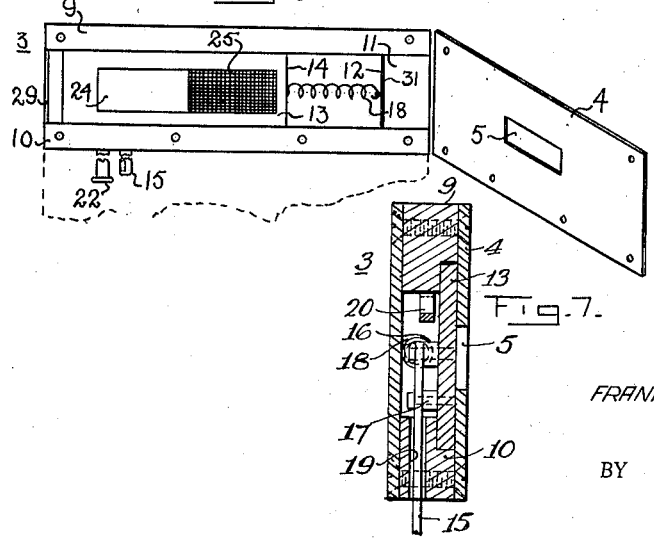

2,102,905

UNITED STATES PATENT OFFICE 2,102,905

SIGNALING APPARATUS

Frank B. MaGee, West Hollywood, Calif., assignor to United Research Corporation, Long Island City, N. Y., a corporation of Delaware Application February 23, 1934, Serial No. 712,585

10 Claims. (Cl. 116—67)

This invention relates to photographic apparatus which is particularly useful in the art of recording sound motion pictures wherein one film is used to photograph a picture component and a second film is used to record a sound component. These two films are united on a final positive print adapted to be run through a standard sound projector, whereby sound motion pictures will be displayed.

As will be readily understood it is essential that the sound film and the picture film are correctly matched in order to produce synchronism there-between. In order to accomplish this it has been the custom in the past to use a so-called "slate and clapper stick" which comprises a board bearing a written description of the "shot" in progress, attached to the top of which there is a clapper stick. The clapper stick comprises a pair of blades pivotally fastened together at one end, and painted in various colors the more easily to distinguish them.

In the operation of this device an assistant or "grip" stands in front of a motion picture camera and holds the slate, with the blades of the clapper stick opened. At a given signal, when the camera and the recording microphone are in operation, the grip claps the blades together. The click resulting at the moment of impact produces a distinctive sound record on the sound film, while at the same time one particular frame on the picture film registers the exact instant that the blades come together. The film "cutter" then uses these two indicating marks to match the two films together.

A great disadvantage of this arrangement is that sometimes a "grip" will bring the blades together with such force that the recording light valve is broken, or the ribbons thereof are stretched, changing the spacing and sensitivity of the valve. As will be readily understood this causes a considerable loss of time in changing and warming up a new valve if the light valve has been broken or an impairment in quality if the spacing has been changed and this change has not been corrected.

A second disadvantage is that a "grip" sometimes brings the blades together so gently that only a very faint sound is produced whereby the indicating mark on the sound film is barely perceptible, making it extremely difficult, if not impossible, for the "cutter" to correctly match the sound and picture films.

The present invention overcomes these difficulties by providing a slate or clapper which automatically produces a sound of the same intensity each time it is operated. This enables the sound mixer to record the synchronizing mark at a level that is easily seen on the film but which does not injure the valve. Another important advantage is that the camera records the passage of a white surface across an aperture in a dark ground so that at the instant the click is heard by the recording microphone, the aperture is completely white, making the matching of a sound and picture film quite definite and simple.

For further details of this invention reference may be made to the drawing wherein:

Fig. 1 is an elevation of a slate provided with the invention.

Fig. 2 is a rear view of the apparatus of Fig. 1.

Fig. 3 is an end view of the apparatus of Fig. 1.

Fig. 4 is an elevation corresponding to Fig. 1 with the cover plate removed.

Fig. 5 is a view, partly in cross-section, corresponding to Fig. 2 with the cover plate removed.

Fig. 6 is a view corresponding to Fig. 4 with the apparatus in its cocked position.

Fig. 7 is a cross-sectional view along the line 7—7 of Fig. 5 with the cover plate in place.

Fig. 8 is a fragmentary view corresponding to a portion of Fig. 6 with the hammer board removed.

Referring more particularly to the drawing the slate 1, attached to a frame 3, bears a legend 2 suitably descriptive of the "shot" in progress. The frame 3 has a front cover plate 4 (Fig. 6) which has an aperture 5 therein. Plate 4 is suitably fastened to the frame 3 by means of the screws 6. Similarly the rear of the frame 3 is covered by a plate 7 (Fig. 2) suitably fastened thereto by the screws 8.

The frame 3 comprises substantially a pair of guide rails 9 and 10 conjoined at one end by a strut member 29 and at the opposite end by a strut member 11 having a hammer face 12 (Fig. 6). A combined hammer board and flag 13 is mounted for movement along the guide rails 9 and 10, so that an end face 14 thereof contacts the hammer face 12 when in the rest position shown in Fig. 4. Hammer face 12 may be covered with a piece of felt 31 if so desired, in order to obtain a sonic vibration of low frequency which may be more easily seen on the sound film.

Mounted on the back of the member 13 is a depending hammer finger member or finger piece 15 which is suitably fastened to the member 13 by lugs 16 and 17. The member 15 passes through an aperture 19 (Fig. 5) in the frame 3 and conveniently projects therefrom as shown in Fig. 2. A coil spring 18 fastened at one end to the lug 16 and at the other end thereof to the frame 3 resiliently couples the hammer member 13 to the frame 3.

There is anchored to the frame member 3 at 30 a leaf spring 20 having an eccentric lug or catch 21 mounted thereon. A release trigger 22 engaging the free end of the spring 20 projects through an aperture in the casing 3 and is conveniently located as shown in Fig. 2. A cotter pin 23 normally resting on the frame 3 (Fig. 5) keeps the trigger finger 22 in position. On the front surface of the member 13, and in alignment with the aperture 5, two sections are painted, one white and the other black, as shown at 24 and 25 respectively. These sections are adapted to alternately appear behind the aperture 5.

In the operation of this device the normal rest position is as shown in Fig. 1 wherein the white portion 24 of the member 13 is visible through the aperture 5 in the cover plate 4. The cover plate 4 is painted some contrasting color, such as black. The "grip" retracts the finger 15 towards the trigger 22 as shown in Fig. 6 whereby the black portion 25 of the member 13 appears behind the aperture 5 and the lug member 16 is engaged and held stationary by the catch 21. The spring member 18 at this time is extended or tensioned as shown in Fig. 6.

At the start of the recording of sound and picture on separate films, and to facilitate the recording of corresponding start marks thereon, the "grip" then presses the trigger member 22 which in turn raises the leaf spring 20 and the catch 21, thus releasing the lug 16 so that the coil spring member 18 returns the member 13 to its normal position, with a striking blow. The instant surface 14 meets the hammer face 12 a loud sound is produced which is recorded by the microphone (not shown) and the white member 24 which has been advancing with the member 13 during the return to normal position, once again completely fills the aperture 5.

Thus it will be seen that by this arrangement the same density of mark is always produced on the sound film without fear of damage to the recording equipment. It is easy also for the "cutter" to determine the exact instant when the aperture 5 shows completely white, and at that point the picture film will register in synchronism with the click recorded on the sound film. One is assured by the use of this invention of always producing a perfectly synchronized sound motion picture film.

Having thus described the invention what is claimed as new and desired to secure by Letters Patent is:

1. Signal apparatus for facilitating the recording of start marks on separate sound and picture film records comprising in combination, a frame support having a hammer face, a hammer member slidable in said support and having a striking surface adjacent said hammer face, resilient means interconnecting said support and said hammer member for bringing said hammer surface and said striking surface together with a predetermined force to produce an audible signal, and means responsive to the movement of said hammer member to indicate the position thereof.

2. Signal apparatus for facilitating the recording of start marks on separate sound and picture film records comprising in combination, a support, a hammer member slidable in said support, resilient means connecting said slidable member to said support and adapted to bring said member in contact with said support with sufficient force to produce an audible signal, a spring catch mounted on said support, a release trigger adapted to engage said spring catch, a control handle mounted on said slidable member adapted to control the position of said slidable member, and means responsive to the movement of said hammer member to indicate the position thereof.

3. Signal apparatus for facilitating the recording of start marks on separate sound and picture film records comprising a support, a movable member mounted on said support, a resilient member interconnecting said support and said movable member, means for releasably securing said movable member under control of said resilient member, and a signaling device carried by said movable member, said support comprising means emitting an audible signal upon release and contact therewith of said movable member.

4. Signal apparatus for facilitating the recording of start marks on separate sound and picture film records comprising a support, a movable signal member mounted on said support, a resilient member interconnecting said support and said movable member, means for positioning said movable member relative to said support, said means comprising a spring catch mounted on said support, a release trigger for said spring catch, and a control handle mounted on said movable member, whereby said movable member is returned to rest at a predetermined speed by said resilient member when said trigger is released to produce an audible signal by contact and a visual signal by position.

5. Signal apparatus for facilitating the recording of start marks on separate sound and picture film records comprising a support having a hammer face, a movable hammer and flag member mounted on said support, resilient means interconnecting said support and said hammer and flag member, and means for positioning said hammer and flag member relatively to said support and for releasing said hammer and flag member, said means comprising a release trigger whereby when said trigger is released said resilient means impels said hammer and flag against said hammer face with a predetermined force to produce an audible signal.

6. Signal apparatus for facilitating the recording of start marks on separate sound and picture film records comprising a support having an aperture therein, a flag member slidably mounted on said support behind said aperture, a hammer face for said flag member on said support, resilient means interconnecting said flag member and said support and adapted to bring said member in contact with said support with sufficient force to produce an audible signal, a pair of different colors on said flag member, and a catch member mounted on said support for positioning said flag member in one position, whereby one of said colors appears behind said aperture when said flag member is in said one position and another of said colors appears behind said aperture when said flag is in another position.

7. Signal apparatus for facilitating the recording of start marks on separate sound and picture film records comprising the combination with a support, of a spring carried thereby and anchored at one end thereto, a catch mounted on said spring, a trigger for the free end of said spring and projecting beyond said support, a hammer member carried by said support, resilient means to couple said hammer member to said support, a finger piece fastened to said hammer member whereby movement of said finger piece will retract said hammer from normal position to engage said catch and tension said resilient means, whereby pressure on said trigger member will disengage said hammer from said catch, the resilient means returning said hammer member to normal position with a striking blow to produce an audible signal, and a signaling device responsive to the movement of said hammer member to indicate the position thereof.

8. Signal apparatus for facilitating the recording of start marks on separate sound and picture film records comprising the combination with a support, of a spring carried thereby and anchored at one end thereto, a catch mounted on said spring, a trigger fastened to the free end of said spring and projecting beyond said support, a multicolored hammer member carried by said support, resilient means to couple said hammer member to said support, a finger piece fastened to said hammer member whereby movement of said finger piece will retract said hammer from normal position to engage said catch and tension said resilient means, whereby pressure on said trigger member will disengage said hammer from said catch, the resilient means returning said hammer member to normal position with a striking blow to produce an audible signal, and said support having an aperture therein adjacent said hammer adapted to display one of said colors carried by said hammer when the hammer is in its normal position and a different color when said hammer is not in its normal position.

9. Signal apparatus for facilitating the recording of start marks on separate sound and picture film records comprising in combination, a frame support having a hammer face, a hammer member slidable in said support and having a striking surface adjacent said hammer face, resilient means interconnecting said support and said hammer member for bringing said hammer surface and said striking surface together with a predetermined force to produce an audible signal, and a flag attached to said hammer member.

10. Signal apparatus according to claim 9 wherein is included a slate integrally united with said frame support.

FRANK B. MaGEE.